(12) United States Patent
Greenhalgh et al.

(10) Patent No.: US 12,731,379 B2
(45) Date of Patent: Sep. 8, 2026

(54) CALIBRATING OUTPUT FROM AN IMAGE CLASSIFIER

(71) Applicant: Skin Analytics Ltd, Cambridge (GB)

(72) Inventors: Jack Greenhalgh, London (GB); Polychronis Kemos, London (GB); David Bazaga Garcia, London (GB); Neil Daly, Redwood City, CA (US)

(73) Assignee: Skin Analytics Ltd, Cambridge (GB)

( * ) Notice: Subject to any disclaimer, the term of this patent is extended or adjusted under 35 U.S.C. 154(b) by 669 days.

(21) Appl. No.: 17/934,182

(22) Filed: Sep. 21, 2022

(65) Prior Publication Data

US 2024/0096061 A1 Mar. 21, 2024

(51) Int. Cl.

*G06V 10/84* (2022.01)
*G06T 7/00* (2017.01)
*G06V 10/764* (2022.01)
*G06V 10/766* (2022.01)
*G06V 10/776* (2022.01)

(52) U.S. Cl.

CPC .......... *G06V 10/765* (2022.01); *G06T 7/0012* (2013.01); *G06V 10/766* (2022.01); *G06V 10/776* (2022.01); *G06T 2207/30088* (2013.01); *G06T 2207/30096* (2013.01); *G06V 2201/03* (2022.01)

(58) Field of Classification Search

USPC ......... 128/916, 920, 922–925; 382/128–133, 382/154–172; 706/1–62, 900–903, 924

See application file for complete search history.

(56) References Cited

U.S. PATENT DOCUMENTS

| | | | | |
|---|---|---|---|---|
| 10,878,567 | B1 * | 12/2020 | Abid | A61B 5/7267 |
| 2012/0066163 | A1 * | 3/2012 | Balls | G16B 40/00 435/6.12 |
| 2016/0155069 | A1 * | 6/2016 | Hoover | G06Q 30/06 706/12 |
| 2019/0244287 | A1 * | 8/2019 | Prasad Datta | G06Q 40/03 |
| 2020/0107787 | A1 * | 4/2020 | Sarkaria | A61B 5/682 |
| 2021/0169336 | A1 * | 6/2021 | Sanchez | A61B 5/7264 |
| 2022/0036194 | A1 * | 2/2022 | Sundaresan | G06N 3/0464 |
| 2022/0156929 | A1 * | 5/2022 | Wang | G06V 10/776 |
| 2023/0127401 | A1 * | 4/2023 | Bekelman | G06N 7/01 705/3 |

OTHER PUBLICATIONS

Rodriguez-Diaz Eladio; Methods and Systems for Determining an Object Map; 2021 (Year: 2021).*

(Continued)

*Primary Examiner* — Marcellus J Augustin
(74) *Attorney, Agent, or Firm* — Stoel Rives LLP

(57) ABSTRACT

An apparatus for calibrating output from an image classifier. The apparatus has an image classifier trained to compute, from an image, confidence values for each of a plurality of skin conditions potentially depicted in the image. The apparatus has a processor to compute a probability score for at least one skin condition by adjusting an associated confidence value using information from an incidence corrected data set which is a plurality of images resampled according to data about an incidence of the skin condition in a population from which the image was captured.

13 Claims, 11 Drawing Sheets

(56) References Cited

OTHER PUBLICATIONS

Wang Lu; An Apparatus and Method for Moderating a Skin Lesion Detection Model; 2022 (Year: 2022).*

Sahu Swapnasarit; Data Correctness Optimization; 2021 (Year: 2021).*

Bhattachary A; Method and System for Classification of Endoscopic Images Using Deep Decision Networks (Year: 2017).*

Abid Abdellatif; System to Collect and Identify Skin Conditions From Images and Expert Knowledge; 2021 (Year: 2021).*

International Search Report and Written Opinion dated Sep. 11, 2023 for PCT Application PCT/EP2023/069334, pp. 1-13.

Filho, Telmo , et al., "Classifier Calibration: How to assess and improve predicted class probabilities: a survey", arxiv.org, Cornell University Library, 201 Olin Library Cornell University Ithaca, NY, Dec. 20, 2021, pp. 1-58.

Jacob, Carse , et al., "Calibration of Deep Medical Image Classifiers: An Empirical Comparison Using Dermatology and Histopathology Datasets", Sep. 14, 2022, pp. 89-99.

Mozafari, Azadeh , et al., "Unsupervised Temperature Scaling: An Unsupervised Post-Processing Calibration Method of Deep Networks", arxiv.org, Cornell University Library, 201 Olin Library Cornell University Ithaca, NY, May 2019, pp. 1-7.

* cited by examiner

LESION 1 OF 1
PRIMARY OUTCOME
MELANOMA
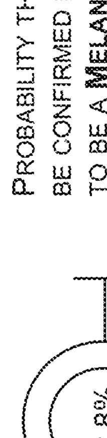
PROBABILITY THAT THIS LESION WILL BE CONFIRMED BY HISTOPATHOLOGY TO BE A MELANOMA.
DERM CLASSIFIES AS MELANOMA ANY LESION WITH A PROBABILITY ABOVE 0.5%
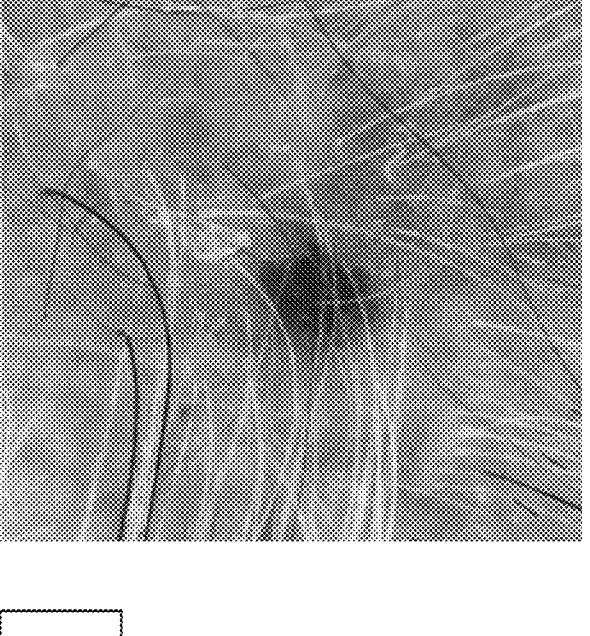
FIG. 6

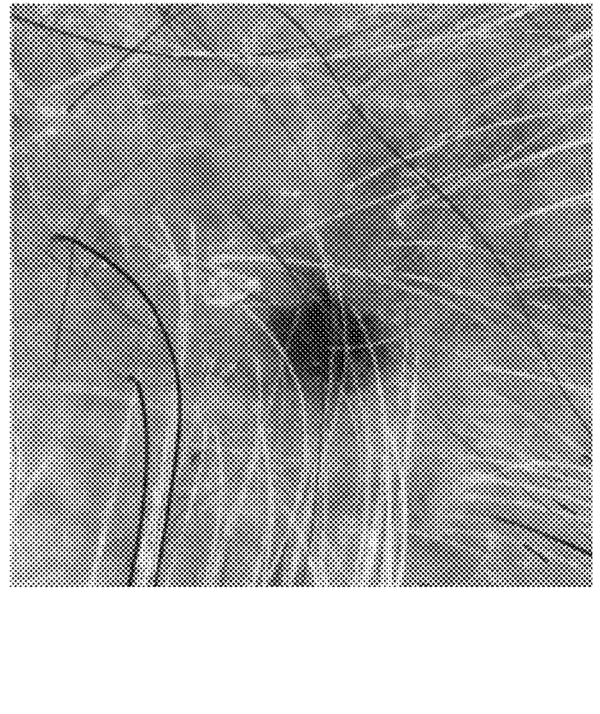
LESION 1 OF 1
HIGHEST LIKELIHOOD
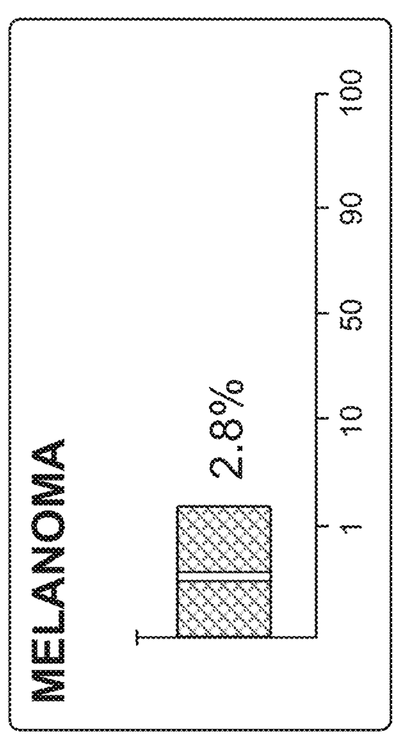
FIG. 7

LESION 1 OF 1
HIGHEST LIKELIHOOD
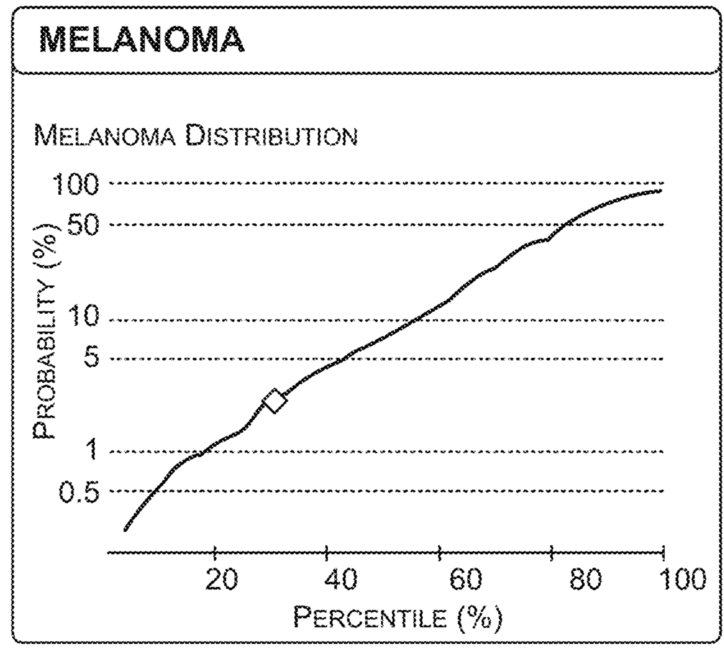
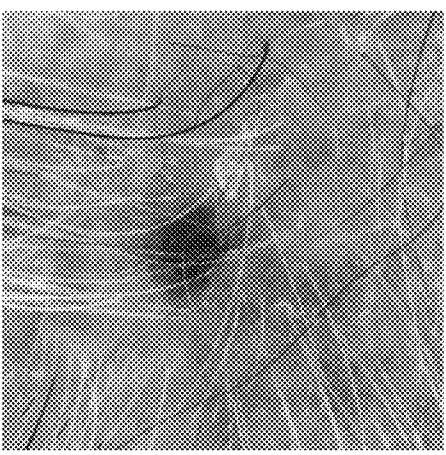
PERCENTILE 33
THE LESION SCORED A PROBABILITY FOR MELANOMA HIGHER THAN 33% OF THE HISTOLOGICALLY-CONFIRMED MELANOMAS USED IN THE EVALUATION OF DERM.
FIG. 8

RECOMMENDED NEXT MANAGEMENT STEP

CONSIDER BIOPSY

PROBABILITY ANALYSIS

| LESION TYPE | PROBABILITY |
|---|---|
| **ACTINIC KERATOSIS** | **41.5%** |
| **SQUAMOUS CELL CARCINOMA** | **7.3%** |
| SQUAMOUS CELL CARCINOMA IN SITU | 1% |
| **MELANOMA** | **0.8%** |
| BASAL CELL CARCINOMA | 0.1% |
| ATYPICAL NEVUS | 0% |

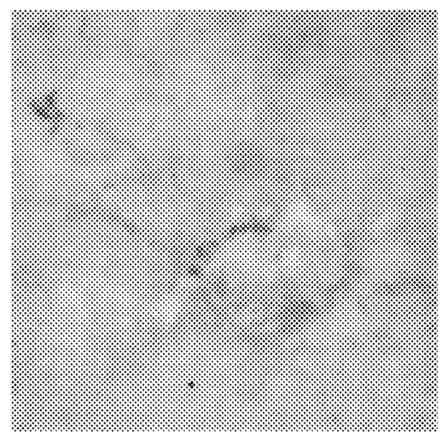

RECOMMENDED NEXT MANAGEMENT STEP

CONSIDER BIOPSY

HIGHEST LIKELIHOOD

ACTINIC KERATOSIS

PROBABILITY THAT THIS LESION WILL BE CONFIRMED BY HISTOPATHOLOGY TO BE AN ACTINIC KERATOSIS

RULE OUT

SQUAMOUS CELL CARCINOMA

PROBABILITY THAT THIS LESION WILL BE CONFIRMED BY HISTOPATHOLOGY TO BE A SQUAMOUS CELL CARCINOMA.

MELANOMA

PROBABILITY THAT THIS LESION WILL BE CONFIRMED BY HISTOPATHOLOGY TO BE A MELANOMA.

FIG. 10

CALIBRATING OUTPUT FROM AN IMAGE CLASSIFIER

BACKGROUND

Dermoscopy, also known as dermatoscopy, is a form of skin surface microscopy, often used in skin cancer diagnosis and, more generally, the examination of skin lesions. A dermascope, also known as a dermatoscope, is an instrument used to perform dermoscopy; the dermascope comprises a magnifier and a light source (polarized or non-polarized).

Image classifiers operate to automatically assign class labels from a plurality of class labels to an image according to a class of object depicted in the image.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus for calibrating output from an image classifier. The apparatus has an image classifier trained to compute, from an image, confidence values for each of a plurality of skin conditions potentially depicted in the image. The apparatus has a processor to compute a probability score for at least one skin condition by adjusting an associated confidence value using information from an incidence corrected data set which is a plurality of images resampled according to data about an incidence of the skin condition in a population from which the image was captured.

DESCRIPTION OF THE DRAWINGS

The present description will be better understood from the following detailed description read in light of the accompanying drawings, wherein:

FIGS. 6-10 are schematic representations of further exemplary user interfaces to display the output of the machine learning classifier.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The term "confidence value" is used to refer to a numerical output value from an image classifier, where there is typically one confidence value per class in a plurality of classes used by the image classifier.

The terms "probability" and "probability score" are used to refer to a percentage computed from a confidence value for a particular class of a plurality of classes. The percentage takes into account incidence of the plurality of classes in an examined population of people. A probability score optionally has a probability range which is a range of values containing the probability score.

The inventors have recognised that where an image classifier is used to classify skin lesions depicted in images, confidence values output by the image classifier are difficult to use with robustness and accuracy in downstream automated or other processes due to lack of calibration. In various examples described herein an output calculator takes confidence values output by an image classifier and calibrates the confidence values to produce probability scores and optionally one or more of: an indication of a skin lesion type to be ruled out for a patient (referred to as "rule out"), and an indication of a highest likelihood skin lesion type depicted in an image of the patient's skin. The output calculator takes into account incidence data about incidence of different types of skin lesion in populations of people at types of location or geographies where the image classifier is to be used. A non-exhaustive list of examples of type of location is primary care medical clinic, secondary care hospital, tertiary care hospital, school, residential care home for the elderly.

The present technology is concerned with outputting a result associated with an image captured by an image-capture device or dermascope imaging device. The image-capture device can be any device with a camera or optical sensor. A dermascope, also known as a dermatoscope, is an instrument used to perform dermoscopy, the dermascope comprises a magnifier and a light source (polarized or non-polarized). In some examples, a dermascope can be attached to an image-capture device, and a captured image of a skin lesion, by the image-capture device combined with the dermascope, is processed using an image classifier to distinguish between benign and malignant skin lesions. An image-capture device combined with a dermascope is referred to as dermascope imaging device.

Figure 1:
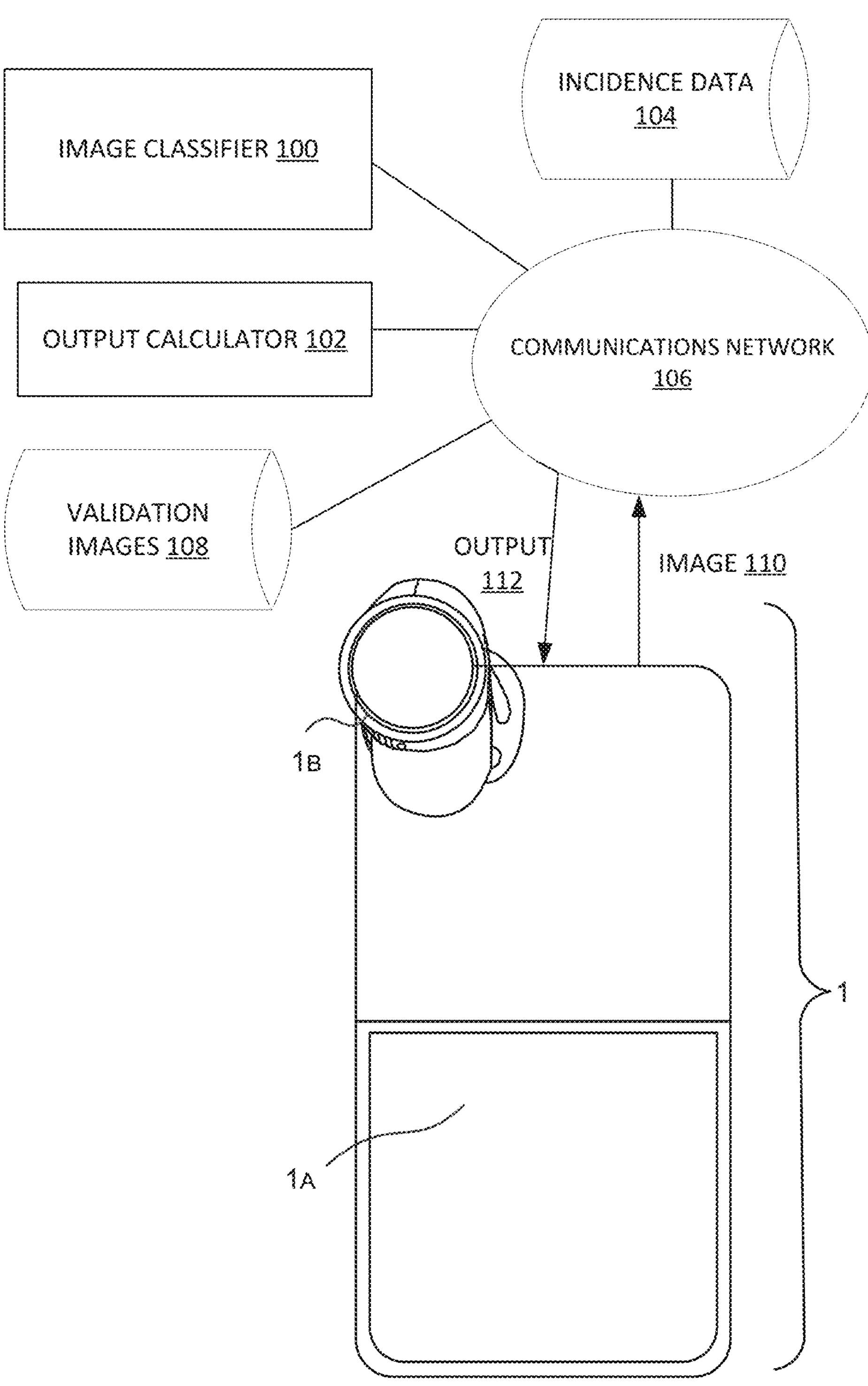
FIG. 1 is a schematic diagram of an example dermascope imaging device as well as an image classifier and output calculator.

FIG. 1 shows an image-capture device 1*a* attached to a dermascope 1*b*, i.e. a dermascope imaging device 1. In some examples, the image-capture device 1*a* comprises a dermascope 1*b*, i.e. they are formed as a single device.

In the example of FIG. 1 the image-capture device 1*a* is a smart phone although it is not essential to use a smart phone and any suitable image-capture device is usable. In the example of FIG. 1 the image-capture device 1*a* is in communication with an image classifier 100 via a communications network 106 such as the internet, an intranet or any other communications network. The image-capture device 1*a* is able to send an image 110 it has captured to the image classifier 100 and in response, to receive an output 112 from an output calculator 102. The image classifier 100 is any computer implemented image classifier such as a convolutional neural network, a random decision forest, a support vector machine or other image classifier. The output calculator 102 is computer implemented and carries out one or more computations as explained in detail below. The output calculator 102 optionally uses incidence data 104 which is data about the frequency of occurrence of different types of skin lesion in various different populations of people. The output calculator 102 optionally uses validation images 108 which are images of skin lesions that have not been used to train the image classifier 100.

In the example of FIG. 1 the image classifier and output calculator 102 are deployed as web services. However, it is not essential to use a web service deployment. The functionality of the image classifier and the output calculator 102 is shared between the image-capture device 1*a* and one or more external computing devices in some cases. In some cases the image classifier 100 and the output calculator 102 are deployed on the image-capture device itself.

In various examples, the image classifier 100 is configured in such a way that 'sensitivity levels' for each of the skin lesions detected in a captured image are individually set. For example, the image classifier 100 is configured to detect 95% of melanomas, 90% of squamous cell carcinomas (SCCs), and 90% basal cell carcinomas (BCCs). However, when operating at high sensitivity for multiple lesions, it is possible that a single lesion is classified as multiple lesion types by the image classifier 100. In various examples, an output calculator 102 enables higher risk lesions to be prioritised over lower risk ones. Ensuring that higher risk lesions are prioritised allows patients to be referred to the correct treatment pathway.

In various examples an output calculator 102 used in conjunction with an image classifier 100 computes several outputs, referred to herein as "Rule out" and "highest likelihood". The output calculator 102 is able to compute probability scores for each classification type (rule out and highest likelihood) in some cases. These outputs inform a user of the classification which will result in the safest patient management outcome (Rule out), as well as the lesion most likely to be contained in the image (highest likelihood).

In various examples, the output calculator 102 computes probability scores for each classification which assists in predicting the real-world probability that the lesion label is correct. This probability score is calculated using both the expected incidence of each lesion type in a care setting and geography where the image classifier 100 is used (e.g. primary care in the UK, secondary care in the US, etc.) and the confidence of prediction provided by the image classifier 100. Optionally, the probability score is provided with a range based on the statistical certainty and expected variation in incidence of skin lesion types.

Figure 2:
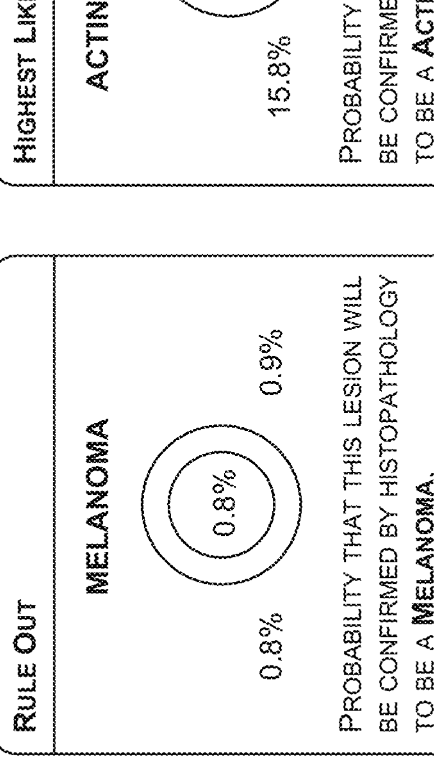
FIG. 2 is a schematic representation of an exemplary user interface to display the output of the image classifier.

FIG. 2 shows an example output of the image classifier 100 in the form of a graphical display. The output comprises a "rule out" and "highest likelihood" output corresponding with the captured image (also shown on the left-hand side of FIG. 2). Probability scores are also provided in this example. As shown in FIG. 2 the rule out output is simple to interpret by lay people. It lists the class of skin lesion which is to be ruled out for the patient, which in this case is melanoma. In the example of FIG. 2 the probability score from the output calculator is 0.8% for the rule out output. A range either side of the probability score is displayed as well. On the right hand side the graphical display indicates the highest likelihood type of skin lesion is actinic keratosis with a probability score of 16.6%. The highest likelihood display is simple to interpret by a lay person. The probability scores in FIG. 2 have been computed by the output calculator as described below, so as to take into account incidence levels for a location where the image of the lesion was captured.

The 'rule out' output in FIG. 2 is determined using a lesion risk priority order (shown in FIG. 3) and using a method as described with reference to FIG. 4.

Figure 3:
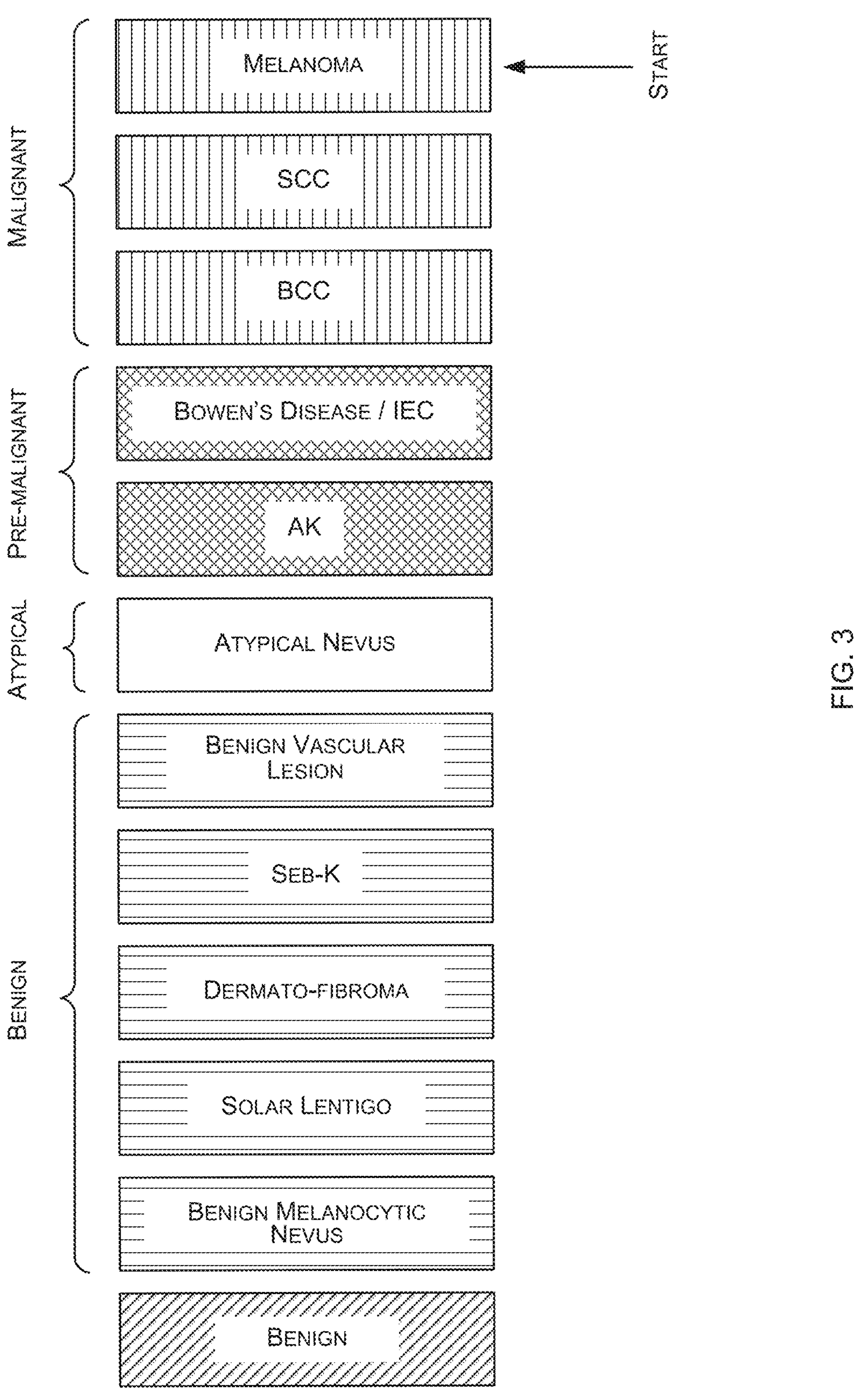
FIG. 3 is a schematic representation of the risk priority order for lesion assessment.

FIG. 3 shows a list of types of skin lesion which are ordered according to health risk. The highest risk is melanoma, followed by SCC and BCC; these three types are malignant. Next is Bowen's disease and actinic keratosis (AK) which are both pre-malignant. Next is atypical nevus. Next is a group of benign types which are in order of health risk, benign vascular lesion, seborrheic keratosis (SEB-K), dermatofibroma, solar lentigo, benign melanocytic nevus and benign. Note that FIG. 3 shows one possible order and other orders are usable.

Figure 4:
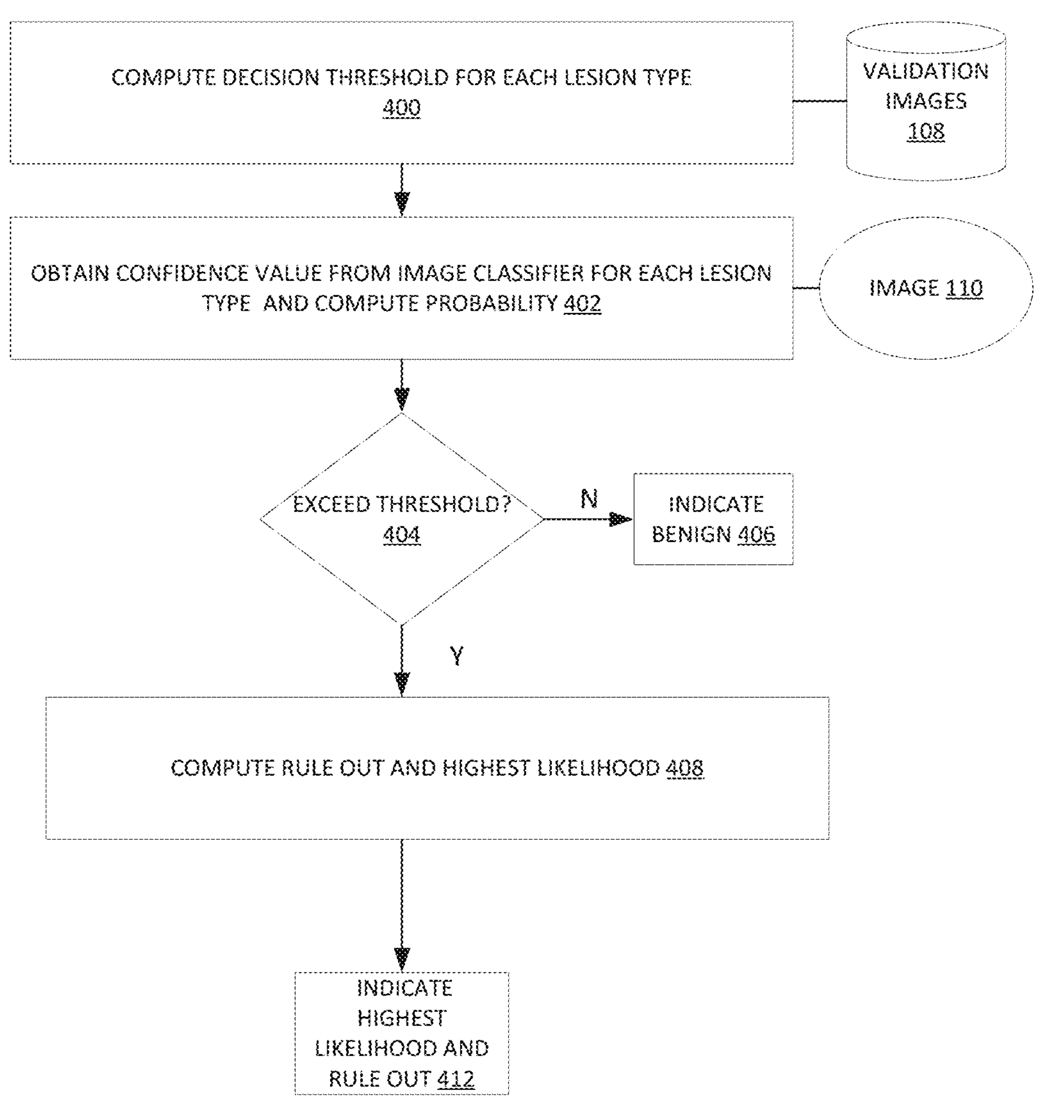
FIG. 4 is a flow diagram of a method performed by an output calculator.

FIG. 4 is a flow diagram of an example method performed by the output calculator. Firstly, for each possible output (11 skin type lesions) a decision threshold is computed 400 for each 'one-against-all' sensitivity level between 0 and 100 at intervals of 0.1, although other intervals can be used. The "one-against-all" sensitivity levels may alternatively be found using any heuristic method, e.g. multiclass classification.

Each decision threshold is calculated on a data set of validation images that are different to the images used to train the image classifier 100. The set of validation images may be a different set of validation images than the one shown at 108 in FIG. 1. In one example of calculating these values for each lesion classification, the decision threshold applied to the output of a softmax function is gradually increased from 0.0 to 1.0, and the one-against-all sensitivity is found at each threshold. The threshold which provides a sensitivity closest to each possible target sensitivity (between 0 and 100 at intervals of 0.1) is stored.

To determine the 'rule out' output 410, the confidence obtained 402 from the image classifier using the image 110 for each lesion is compared 404 to the decision threshold for the configured 'target sensitivity' level in the order shown in FIG. 2. In some examples, the order of FIG. 2 may be different or may include more or fewer lesion types.

If the threshold is exceeded for multiple lesion types the lesion with the highest risk is selected as the 'highest risk classification'. For example, if thresholds are exceeded for both 'melanoma' and 'SCC', the highest risk classification of 'melanoma' will be given, even if the confidence value for SCC is higher than for melanoma.

If the confidence value exceeds the threshold for none of the lesion classifications, the classification of 'benign' 406 is given. This is an intentional safety measure which acts to minimise the risk of under-referring more serious lesions. An agreement on the priority order for the malignant and pre-malignant lesions was made through discussion with trained dermatologists, but this is flexible. The rationale for the order of priority is as follows: Melanoma: Melanoma is the most dangerous form of skin cancer, with the potential to metastasize to other parts of the body via the lymphatic system and blood stream. Consequently, it has the highest rate of mortality of all skin cancer. Squamous Cell Carcinoma (SCC): There is a small risk of a SCC spreading, usually through the lymphatic system and can cause structural damage or in rare cases be fatal. Basal Cell Carcinoma (BCC): It is very rare for BCCs to metastasize but if left untreated they can lead to significant structural damage. Intraepidermal Carcinoma (IEC): The disease is confined to the surface of the skin with only a low chance of developing into invasive Squamous Cell Carcinoma. Actinic Keratosis (AK): This is a scaly spot found on sun damaged skin. Though it is rare for a solitary AK to develop into Squamous Cell Carcinoma, it is considered to be precancerous. Dysplastic nevus (Atypical Nevus): Dysplastic Nevi can be an indicator of risk. They are therefore placed in the risk priority order between pre-malignant and benign conditions.

Users of a dermascope device often prefer for the output of the image classification algorithm to provide a 'confidence score' in addition to a diagnosis, e.g. 20% confident, or 'low/medium/high'. Metrics of this type can be confusing to users as they may be dependent on the performance of the image classifier itself and have little real-world meaning as a result. These confidence scores are not probabilities, and it can be incorrect to interpret them as such.

The inventors have developed a method for producing a meaningful probability score, which calibrates the output of the image classifier 100. An example output may be: 'there is a 40% chance that this lesion is a melanoma'. This is done by using a method to estimate the probability of each classification to be a true positive depending on the image classifier confidence values and the incidence of each lesion type in the examined population. The output calculator may use a polynomial Logit function (or any quantile function) to convert the 'confidence' value from the image classifier to a real-world probability, factoring in the expected incidence range in the population where the device is to be used (e.g. primary care, secondary care). The output calculator receives an indication of the population where the device is to be used as a result of an operator selecting a setting on the smart phone or other computing device. In some cases the output calculator is configured with the indication of the population where the device is to be used during manufacture. The output calculator uses the indication of the population to retrieve relevant incidence data from incidence data store 104.

Several alternatives to the logit function can also be used, such as: fitting a cubic function to the data; using a first order logistic regression; training a Support Vector Regression (SVR) machine learning algorithm to predict probability from confidence score; training an artificial neural network to perform regression to predict the probability from the confidence score, building a histogram of probabilities, and looking up the probability found in each bin for each confidence level; or creating a moving average of the probability depending on the image classification algorithm confidence output. In another example, rather than using a logit function, the probability score is computed by creating a local regression/local polynomial trained to predict probability score from the confidence value. This gives efficiency of computation and accuracy where quantity of training data available is very large since using the local regression or local polynomial is sensitive to the data.

Figure 5:
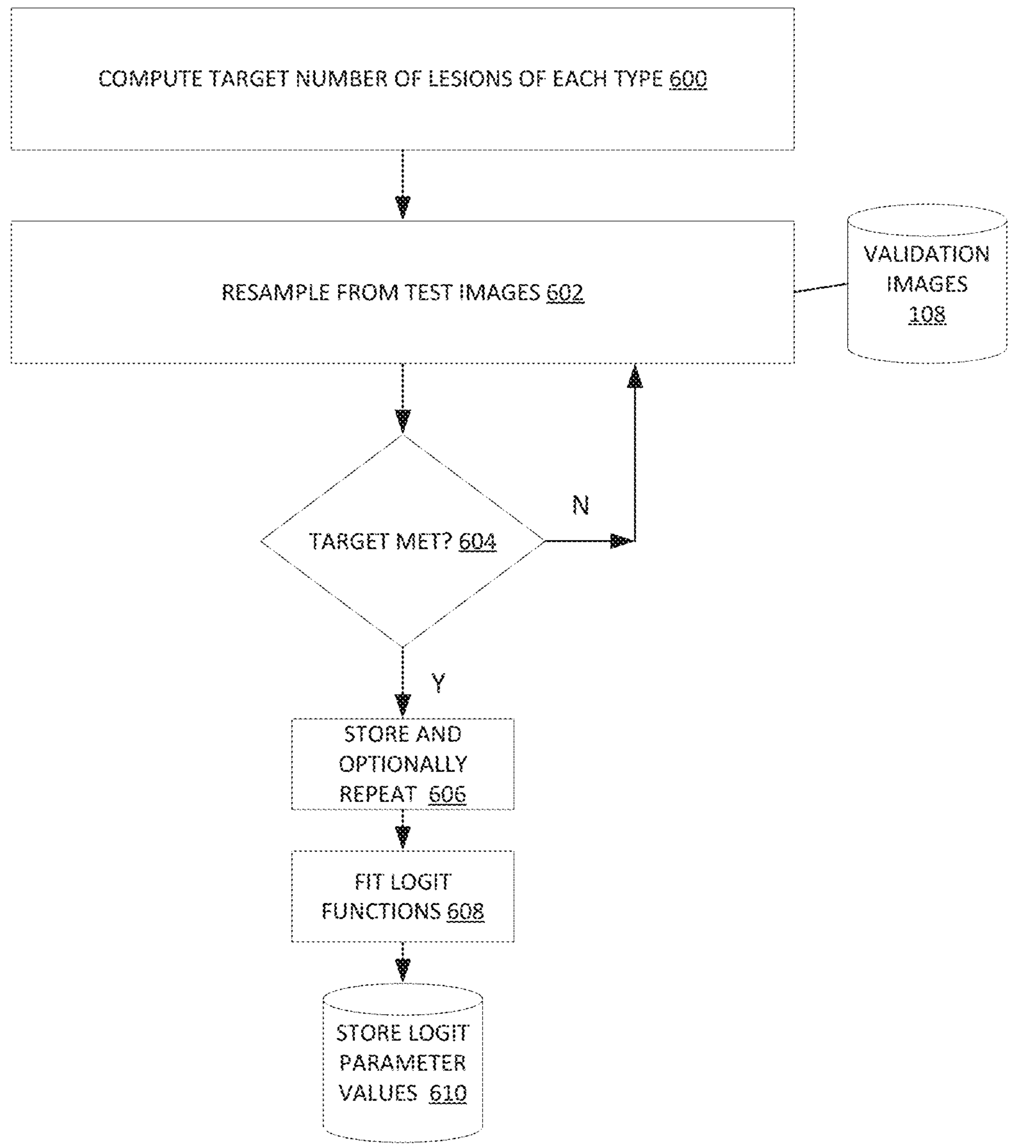
FIG. 5 is a flow diagram of a method of computing logit functions.

FIG. 5 is a flow diagram of an example method performed by the output calculator to determine Logit functions to be used in the process of computing the probability scores. The process involves using over sampling (also referred to as resampling) from the validation images 108 which are the validation images used in the process of FIG. 4. The validation images 108 are a validation data set for validating the image classifier since the validation images 108 have not been used to train the image classifier. Over sampling means sampling from a data set such that the same item from the data set can be sampled more than once. Over sampling is also referred to as resampling. The over sampling is done to form one or more incidence corrected validation data sets.

A target number of lesions of each type is computed 600. The target number is computed taking into account incidence data so that the target number can reflect incidence of skin lesion types in a population of people from which images to be processed using the image classifier 100 are to be drawn.

Optionally, the incidence data 104 is used to compute an incidence profile for each lesion type and an example incidence profile is given in the table below. An incidence profile is any description of the incidence data 104 for the particular population involved. In an example the incidence profile comprises a probability score for a lower incidence of malignant, premalignant and atypical lesions and a probability score for an upper incidence of malignant, premalignant and atypical lesions. Examples of other incidence profiles which are usable are a mean probability score and a standard deviation, an interquartile range of 25 to 75.

TABLE 1

Example incidence profile

| Lesion Type | Lower Incidence (%) | Upper Incidence (%) |
|---|---|---|
| Melanoma | 2.0 | 3.5 |
| SCC | 2.0 | 5.5 |
| BCC | 5.7 | 12.5 |
| IEC | 3.2 | 7.2 |
| AK | 3.2 | 10.7 |
| Atypical Nevus | 1.6 | 2.0 |

The process of FIG. 5 comprises repeating the resampling operation 602 until a target is met at check 604. The check at operation 604 comprises examining the collection of samples obtained from the resampling so far to compute the number of lesions of each type. If the number matches an incidence adjusted target then the resampling ends and the resampled data (referred to as an incidence corrected validation data set) is stored at operation 606. If more than one incidence corrected validation data set is to be created the process repeats.

In one example the targets are computed by computing, the number of lesions of each type in the incidence adjusted data set as follows:

Size of Incidence Adjusted Data Set=100*max(Total Melanomas in Original Data Set/Incidence of Melanoma, Total SCCs in Original Data Set/Incidence of SCC, Total BCCs in Original Data Set/Incidence of BCC, Total IECs in Original Data Set/Incidence of IEC, Total AKs in Original Data Set/Incidence of AK, Total Atypical in Original Data Set/Incidence of Atypical)

The following exemplary formulas may then used to find the number of lesions of each type in the incidence adjusted data set:

Number of Melanomas in Incidence Adjusted Data Set=Size of Incidence Adjusted Data Set*(Melanoma Incidence/100.0);

Number of SCCs in Incidence Adjusted Data Set=Size of Incidence Adjusted Data Set*(SCC Incidence/100.0);

Number of BCCs in Incidence Adjusted Data Set=Size of Incidence Adjusted Data Set*(BCC Incidence/100.0);

Number of AKs in Incidence Adjusted Data Set=Size of Incidence Adjusted Data Set*(AK Incidence/100.0);

Number of IECs in Incidence Adjusted Data Set=Size of Incidence Adjusted Data Set*(IEC Incidence/100.0);

Number of Atypical Lesions in Incidence Adjusted Data Set=Size of Incidence Adjusted Data Set*(AN Incidence/100.0).

The above process may be repeated for the lower incidence value and upper incidence value, resulting in two data sets of confidence values. Once these data sets are created, a 3rd order Logit function is fitted 608 for each lesion type in both the 'lower incidence' and 'upper incidence' data sets. The parameters to fit are defined in the function below:

$$\log\left(\frac{p}{1-p}\right) = \beta_0 + \beta_1 x + \beta_2 x^2 + \beta_3 x^3,$$

and the probability is defined as:

$$p = \frac{1}{1 + e^{-(\beta_0 + \beta_1 x + \beta_2 x^2 + \beta_3 x^3)}}.$$

Which is expressed in words as, the probability score p corresponding to a confidence value x from the image classifier is equal to one divided by one plus e to the negative power of the sum of parameter β0, the confidence value times parameter β1, the square of the confidence value times parameter β2, the cube of the confidence value times parameter β3.

The parameters β0, β1, β2, β3 are found for each lesion type, and for each data set, by fitting Logit functions 608 to the data. The results are then stored 610 and comprise values of Logit function parameters β0, β1, β2, β3 as now explained.

In the case of two data sets, this results in two probability mappings per lesion type, i.e. a total of 12 probability mappings if 6 lesion types are used. The total number of parameters calculated are shown in the Table 2 below for this example and note that other numbers of lesion types, data sets and parameters are used in other examples:

TABLE 2

A total of 48 parameters may be calculated modelling the probability range for each class.

| | UPPER | LOWER |
|---|---|---|
| SKIN_LESION_MELANOMA | $\beta_0, \beta_1, \beta_2, \beta_3$ | $\beta_0, \beta_1, \beta_2, \beta_3$ |
| SKIN_LESION_SCC | $\beta_0, \beta_1, \beta_2, \beta_3$ | $\beta_0, \beta_1, \beta_2, \beta_3$ |
| SKIN_LESION_BCC | $\beta_0, \beta_1, \beta_2, \beta_3$ | $\beta_0, \beta_1, \beta_2, \beta_3$ |
| SKIN_LESION_IEC | $\beta_0, \beta_1, \beta_2, \beta_3$ | $\beta_0, \beta_1, \beta_2, \beta_3$ |
| SKIN_LESION_AK | $\beta_0, \beta_1, \beta_2, \beta_3$ | $\beta_0, \beta_1, \beta_2, \beta_3$ |
| SKIN_LESION_ATYPICAL_NEVUS | $\beta_0, \beta_1, \beta_2, \beta_3$ | $\beta_0, \beta_1, \beta_2, \beta_3$ |

Once the Logit parameters have been stored 610, they can be applied to the image classifier's confidence values. In an example the image classifier comprises two image classifiers, one for lower incidence (such as the lowest expected incidence in a primary care setting in the United Kingdom (UK)) and one for higher incidence (such as the highest expected incidence in a primary care setting in the UK). The first model is referred to as a lower incidence model. The second model is referred to as a higher incidence model. For each lesion type, the range between the lower bound probability interval of the lower incidence model and the upper bound probability interval of the higher incidence model is calculated across all possible values of the image classifier (0 to 1). In addition to the range, the mean of the maximum and minimum probability is also calculated. The probability values for the 'Rule Out classification' output are returned as the 'Rule Out classification probabilities', which include the average, lower, and upper values. In some examples, the probability outputs are only returned for malignant, premalignant, and atypical lesion types. Probabilities may not be returned if the lesion has a benign type as the primary classification.

In some examples, the 'highest likelihood' output may be determined using the probability scores for each lesion. If more than one malignant or premalignant lesion type is above its decision threshold, the lesion type with the highest probability is returned as the 'highest likelihood' output, provided that this lesion type is different from the 'rule out' output. The following exemplary table (Table 3) contains possible combinations of output for 'rule out' and 'highest likelihood' output:

TABLE 3

All possible output combinations for 'rule out' and 'highest likelihood' output

| 'Rule out' output | 'Highest likelihood' output |
|---|---|
| Melanoma | nothing |
| Melanoma | SCC |
| Melanoma | BCC |
| Melanoma | IBC |
| Melanoma | AK |
| SCC | nothing |
| SCC | BCC |
| SCC | IEC |
| SCC | AK |
| BCC | nothing |
| BCC | IEC |
| BCC | AK |
| IEC | nothing |
| IEC | AK |
| AK | nothing |
| Dermatofibroma | nothing |
| Benign Melanocytic Nevus | nothing |
| Seb K | nothing |
| Solar Lentigo | nothing |
| Benign Vascular Lesion | nothing |
| Benign | nothing |
| Atypical Nevus | nothing |
| image quality fail: blurred | nothing |
| image quality fail: too dark | nothing |
| no lesion image | nothing |

FIGS. 6 to 10 illustrate alternative presentations of output generated by the output calculator for display to a medical professional, patient or other end user.

FIG. 6 shows a display for the primary outcome. An image of the skin lesion being assessed is given on one side. On the other side is the name of the primary outcome (in this case melanoma) and a graphical representation of the probability (in this case 2.8%) which is the probability that the lesion will be confirmed by histopathology to be a melanoma.

In the example of FIG. 7 the highest likelihood output is displayed side by side with an image of the skin lesion being assessed. The name of the skin lesion type of the highest likelihood is given together with a graphical representation of the probability score computed by the output calculator. The graphical representation of the probability score is in the form of a bar chart and the probability score as a percentage is also given. This representation of the output provides the 'highest likelihood' output only, without inclusion of the 'rule out' output. A chart accompanying the output provides the probability, without the incidence range, and the threshold above which a lesion is given that label depicted with a narrow bar within the larger bar denoting the probability score (in the example below the probability score is 2.8% and the threshold 0.5%). It is found that the simplicity of the display facilitates use by end users, as they can visually gauge how far the probability value for the assessed lesion is from the probability threshold, in a scale from 1 to 100.

FIG. 8 shows an example of a highest likelihood percentile display. This representation of the output provides the highest likelihood output shown as a percentile of the training data used to train the image classifier 100. The probability score of the lesion sent for analysis is compared against all the histologically-confirmed lesions used for training and their probability scores. The percentile can be calculated from the training dataset 100, or from any other relevant dataset, such as an incidence-adjusted dataset where the software is to be used 600. Displaying the percentile helps the interpreting user gauge how high the probability value is compared to other histologically-confirmed lesions of the same type. This is particularly important as the use of a probability value derived from an AI-based classifier is a new metric not widely used in a healthcare environment and interpreting users do not necessarily understand if a given probability value (e.g. 3.5%) is high or low, so interpreting users can benefit from the context the percentile provides.

Figure 9:
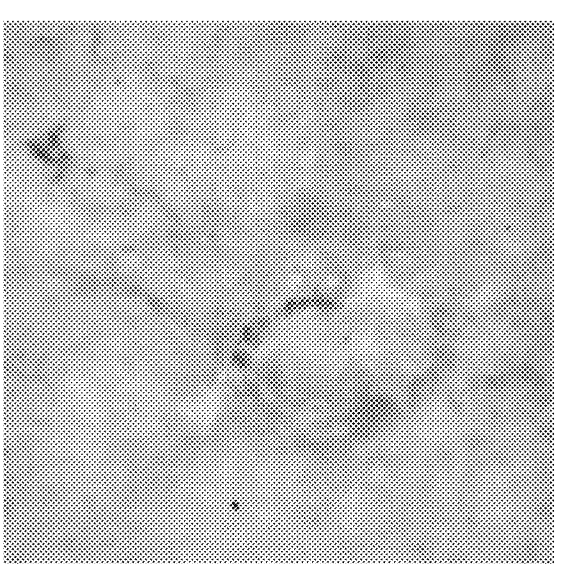

FIG. 9 shows an example of a differential table output. Here a table is displayed with a column for lesion type and a column for probability score, with the lesion type ranked by the probability value in descending order. The lesion types whose probability values exceed their decision threshold are highlighted in bold. A banner is given indicating the next action of "consider biopsy". The content of the banner is dependent on the ranking of the lesion types based on their probability values. The differential table output is particularly helpful for specialists (dermatologists) who wish to obtain an exhaustive dermoscopic analysis of the lesion, with the software's predictions for each skin lesion type to determine the best management outcome.

FIG. 10 shows an example of a differential list display. This representation of the output provides those lesion types which exceed the decision threshold, in order of probability score, with the 'highest likelihood' lesion highlighted or at the top. A banner is given indicating the next action of "consider biopsy". The content of the banner is dependent on the ranking of the lesion types based on their probability values. Similarly to FIG. 9, the differential list display is helpful for specialists (dermatologists) who wish to obtain an exhaustive dermoscopic analysis of the lesion, with the software's highest likelihood and rule out classifications.

Figure 11:
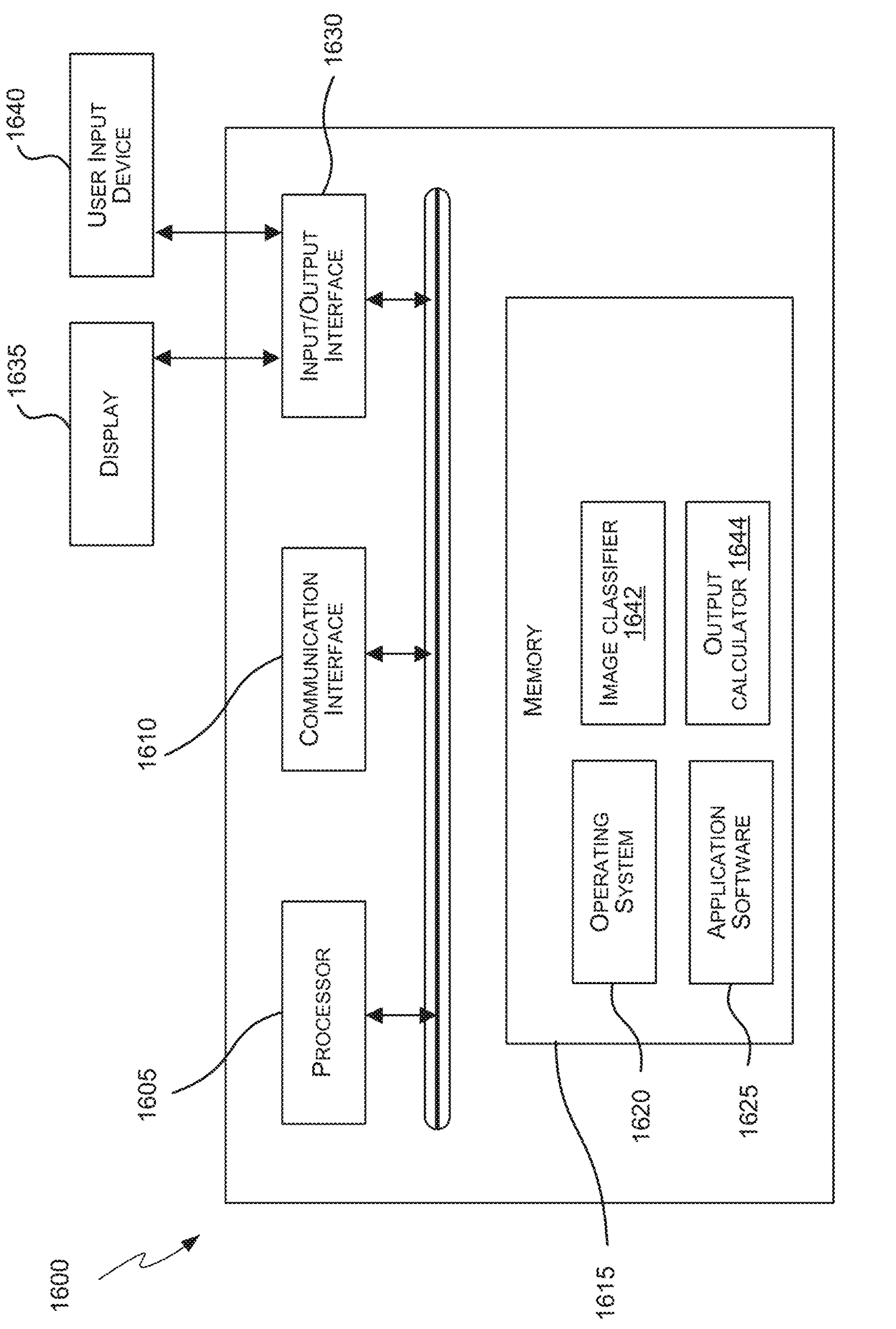
FIG. 11 is a schematic diagram of a computing-based device in which embodiments of the technology are implemented in some examples.

FIG. 11 illustrates various components of an exemplary computing-based device 1600 which are implemented as any form of a computing and/or electronic device, and in which embodiments of an image classifier and/or output calculator are implemented in some examples. As explained with reference to FIG. 1 the computing-based device can be a web server, a smart phone or any other computing-based device such as a tablet computer, a laptop, a desktop personal computer, a wearable computer, a hospital medical image analysis computer.

Computing-based device 1600 comprises one or more processors 1605 which are microprocessors, controllers or any other suitable type of processors for processing computer executable instructions to control the operation of the device in order to classify images and/or process outputs from an image classifier. The processors implement one or more of the methods of FIGS. 4 to 5. In some examples, for example where a system on a chip architecture is used, the processors 1605 include one or more fixed function blocks (also referred to as accelerators) which implement a part of the method of any of FIGS. 4 to 5 in hardware (rather than software or firmware). An image classifier 1642 implements the image classifier 100 of FIG. 1. An output calculator 1644 implements the output calculator of FIG. 1. Platform software comprising an operating system 1620 or any other suitable platform software is provided at the computing-based device to enable application software 1625 to be executed on the device.

The computer executable instructions are provided using any computer-readable media that is accessible by computing based device 1600. Computer-readable media includes, for example, computer storage media such as memory 1615 and communications media. Computer storage media, such as memory 1615, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1615) is shown within the computing-based device 1600 it will be appreciated that the storage is, in some examples, distributed or located remotely and accessed via a network or other communication link (e.g. using communication interface 1610).

The computing-based device 1600 also comprises an input/output interface 1630 arranged to output display information to a display device 1635 which may be separate from or integral to the computing-based device 1600. The display information may provide a graphical user interface to display representations such as those indicated in FIGS. 6 to 10. The input/output interface 1630 is also arranged to receive and process input from one or more devices, such as a user input device 1640 (e.g. a mouse, keyboard, camera, microphone or other sensor). The user input may be used to view probability scores, view images, set parameter values, select incidence data, select validation image data. In an embodiment the display device 1635 also acts as the user input device 1640 if it is a touch sensitive display device.

The computer executable instructions are provided using any computer-readable media that is accessible by networking router. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory) is shown within the computing-based device it will be appreciated that the storage is, in some examples, distributed or located remotely and accessed via a network or other communication link (e.g. using communication interface).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of calibrating output from an image classifier, the method comprising the steps of:

using the image classifier to compute, from an image, confidence values for each of a plurality of skin conditions potentially depicted in the image;

computing a probability score for each skin condition by adjusting the confidence values using information from an incidence corrected data set which is a plurality of images resampled according to data about an incidence of the skin conditions in a population from which the image was captured so that the incidence corrected data set contains a number of images of each skin condition which reflects incidence of each skin condition in the population, wherein the probability score for each skin condition is computed using a neural network to perform regression to predict the probability score for each skin condition from the confidence value for each skin condition, or using a Support Vector Regression (SVR) algorithm trained to predict the probability score for each skin condition from the confidence value for each skin condition; and sending a selected skin condition of the plurality of skin conditions, the probability score for the selected skin condition, or both, to a display.

2. The computer-implemented method of claim 1, wherein the incidence corrected data set comprises images resampled from a validation data set of the image classifier.

3. The computer-implemented method of claim 1, wherein the data about the incidence of the skin conditions is obtained from an incidence data store using information about a geographical location where the image was captured, or information about a type of health care facility where the image was captured.

4. The computer-implemented method of claim 3, wherein the information about geographical location or type of health care facility is received as a result of user input at a user interface.

5. The computer-implemented method of claim 1, wherein the regression performed by the neural network is a first order logistic regression.

6. The computer-implemented method of claim 1, further comprising selecting one of the skin conditions to be ruled out for a patient depicted in the image, by comparing each confidence value to a corresponding decision threshold having been computed from a plurality of validation images of the image classifier, and sending a probability score for the skin condition to be ruled out to the display.

7. The computer-implemented method of claim 1, further comprising selecting one of the skin conditions as a highest likelihood skin condition for a patient depicted in the image, by comparing each confidence value to a corresponding decision threshold having been computed from a plurality of validation images of the image classifier, in a specified order and sending a probability score for the highest likelihood skin condition to the display.

8. The computer-implemented method of claim 7 comprising sending the image to the display for display adjacent to the probability score for the highest likelihood skin condition and a graphical representation of the probability score.

9. The computer-implemented method of claim 7 comprising displaying the probability score for the highest likelihood skin condition as a percentile of training data used to train the image classifier.

10. The computer-implemented method of claim 1, further comprising displaying a table with a column for skin condition and a column for probability score.

11. The computer-implemented method of claim 1, further comprising displaying a list of skin conditions which exceed an associated decision threshold, in order of probability score.

12. An apparatus for calibrating output from an image classifier, the apparatus comprising:

an image classifier trained to compute, from an image, confidence values for each of a plurality of skin conditions potentially depicted in the image;

a processor to compute a probability score for each skin condition by adjusting the confidence values using information from an incidence corrected data set which is a plurality of images resampled according to data about an incidence of the skin conditions in a population from which the image was captured so that the incidence corrected data set contains a number of images of each skin condition which reflects incidence of each skin condition in the population, wherein the probability score for each skin condition is computed using a neural network to perform regression to predict the probability score for each skin condition from the confidence value for each skin condition, or using a Support Vector Regression (SVR) algorithm trained to predict the probability score for each skin condition from the confidence value for each skin condition; and a display operable to display a selected skin condition of the plurality of skin conditions, the probability score for the selected skin condition, or both.

13. A dermascope imaging device comprising a processor and storage having instructions which when executed by the processor:

compute, from an image, confidence values for each of a plurality of skin conditions potentially depicted in the image;

compute a probability score for at least one of the skin conditions by adjusting the confidence value for the skin condition using information from an incidence corrected data set which is a plurality of images resampled according to data about an incidence of the skin condition in a population from which the image was captured so that the incidence corrected data set contains a number of images of each skin condition which reflects incidence of each skin condition in the population, wherein the probability score for each skin condition is computed using a neural network to perform regression to predict the probability score for each skin condition from the confidence value for each skin condition, or using a Support Vector Regression (SVR) algorithm trained to predict the probability score for each skin condition from the confidence value for each skin condition; and send a selected skin condition of the plurality of skin conditions, the probability score for the selected skin condition, or both, to a display.

* * * * *